Feb. 23, 1971     T. E. SMITH ET AL     3,566,384

REMOTE METER READING APPARATUS

Filed Dec. 18, 1967

INVENTORS
THOMAS E. SMITH
WALLACE R. STRAIGHT

BY

*ATTORNEY*

United States Patent Office 3,566,384
Patented Feb. 23, 1971

3,566,384
REMOTE METER READING APPARATUS
Thomas E. Smith, Rush, and Wallace R. Straight, Honeoye Falls, N.Y., assignors to Readex Electronics, Inc., Honeoye Falls, N.Y., a corporation of New York
Filed Dec. 18, 1967, Ser. No. 691,433
Int. Cl. G08c 17/00, 19/10, 19/12
U.S. Cl. 340—200      4 Claims

ABSTRACT OF THE DISCLOSURE

This apparatus enables a meter-reader to read the gas, and/or electric, and/or water meters in a building without entering the building. One of the dials on each meter has its pointer connected to a variable condenser to vary the capacity of the latter as the pointer rotates. This alters the frequency of signal transmitted by a radio transmitter that is conneced to the meter. A meter reader may drive by the building in a vehicle containing a receiver and recording device to pick up and record the signal. The frequency of the signal changes, therefore, with the quantity of the utility consumed. For purposes of identification, different customers are on different carrier frequencies; and adjacent meters have different frequency ranges.

---

This invention relates to meter reading, and more particularly to apparatus for reading gas, water, electricity and similar household utility meters.

It is the practice of utility companies to employ meter readers to read electric, gas, and water meters, to ascertain the consumption of these products on a given premises, as a basis for billing. Very often, however, the meter reader cannot gain admittance to a building; the tenants may happen to be away. As a consequence the meter reader must either return at some other, time or estimate, sight unseen, the reading of the meter or meters. Estimations of consumption are, however, only estimates and never accurate; and the householder may be unhappy because the estimate is too high, or the company may suffer because it is too low.

Other obvious disadvantages of the present system are the vast amount of manhours wasted travelling by foot from house to house, the hazards meter readers encounter in their travels; and the risks homeowners take in leaving their homes unlocked to admit the readers.

The primary object of the present invention is to provide apparatus which will permit reading meters of the type described from a remote point, without entering a household.

Another object of the invention is to provide apparatus for reading gas, electric, and water meters, etc., from a moving vehicle.

Other objects of the invention will be apparent hereinafter from the specification and the recital of the appended claims, particularly when read in conjunction with the accompanying drawing.

Figure 1:
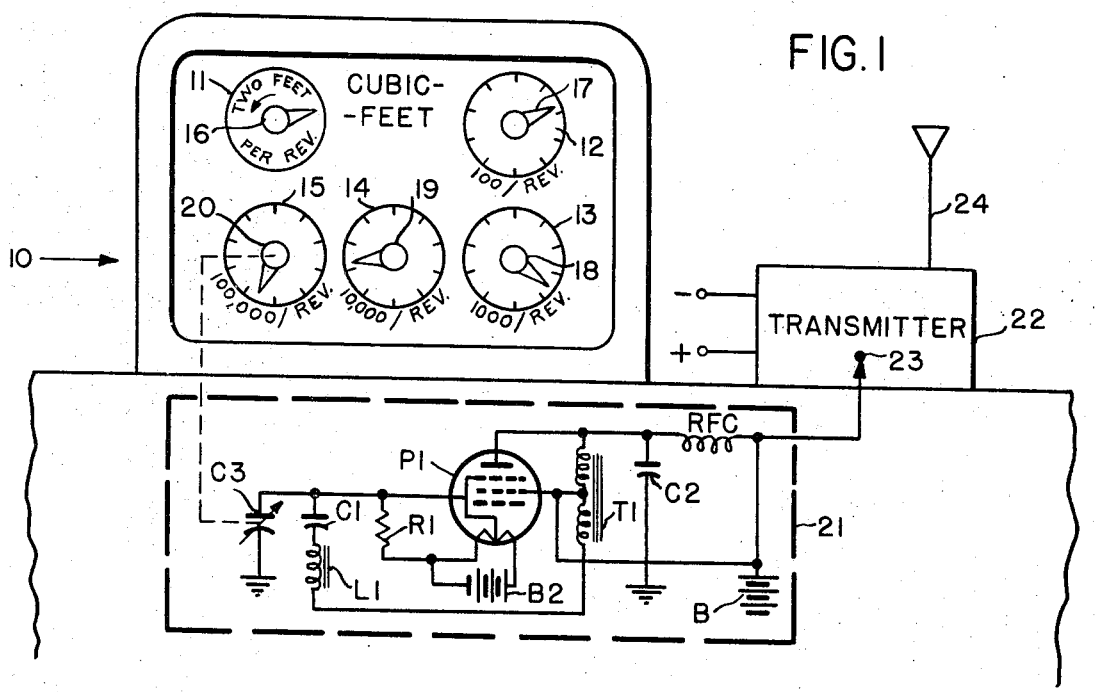
FIG. 1 illustrates schematically a utility meter, and part of an electrically-operated system made in accordance with one embodiment of this invention for enabling the meter to be read remotely.

Referring now to the drawing by numerals of reference, 10 denotes generally part of a conventional utility meter of the type used, for example, to measure the household consumption of gas in cubic feet. The meter includes a plurality of dials 11, 12, 13, 14 and 15, and cooperating pointers 16, 17, 18, 19 and 20, respectively, to register the consumption of gas in units of two cubic feet, hundreds of cubic feet, thousands of cubic feet, the thousands of cubic feet, and one hundred thousands of cubic feet, respectively.

For the purposes of this invention, the shaft of pointer 20 is connected mechanically to the adjustable arm of a variable condenser C3, so that the capacitance of this condenser is changed when this pointer moves. The movement of pointer 20 may be almost imperceptible; but it will be apparent to one skilled in the art that this movement can be accurately transmitted to the variable condenser C3 by gearing or the like, to vary the capacitance of the condenser in accordance with the movement of the arm 20.

The condenser C3 forms part of a modified Hartley oscillator 21, which is mounted adjacent the meter 10 together with a conventional, crystal-controlled transmitter 22. The plate circuit of the oscillator 21 is connected to a battery B through a radio frequency choke coil RFC, which blocks A.C. voltage from the battery. This plate circuit is also connected to a grounded condenser C2; and to a transformer T1, which is in series with inductance coil L1, condenser C1; and the control grid of pentode P1. The battery B2 applies a low D.C. voltage to the cathode of P1, and through resistor R1 to the control grid.

The variable frequency generated in oscillator 21 is fed into the transmitter 22 at 23. As the capacitance of the capacitor C3 changes in response to the movement of the pointer 20 on the dial 15, a corresponding change in the frequency of the signal transmitted by the transmitter 22 occurs.

The transmitter 22 has a directional antenna 24 for transmitting the developed signal in a generally predetermined direction, as, for instance, toward the street or avenue upon which the building, which contains the meter 10, fronts.

Figure 3:
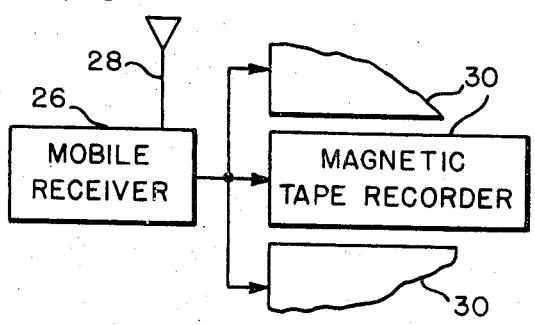
FIG. 3 is a diagrammatic representation of a signal receiving unit adapted to be on a vehicle to record the meter reading.

The person, who is to read the meter 10, travels down the street in a vehicle, which contains a radio receiver 26 (FIG. 3) having an antenna 28 for picking up the signal from transmitter 22, as the vehicle passes the building containing the meter 10. The signals picked up by the receiver 26 may be transferred to one of a plurality of magnetic tape recorders 30, which are coupled in a conventional manner to the output of the receiver 26 to receive information therefrom. Thereafter, in a central office the tape may be played back, and the frequency of the radio signal transcribed thereon will be counted by a conventional frequency counter, and will be recorded. The record will be compared with the record from the previous month; the difference is the quantity of gas that was consumed in the last month by the customer owning the premises at which the particular meter 10 was located. This is what he will be billed.

For the purposes of identification, each customer in a given neighborhood or area will have a different carrier frequency, so the transmitter or transmitters in one residence, will not interfere with the transmitter or transmitters in the adjacent residence. Moreover, the transmitters that do happen to have the same carrier frequencies will be provided with oscillators 21 that have different characteristics, so that although the carrier frequencies may be the same, the frequency of the signals generated by the respective oscillators 21 will be in different ranges, so that two different customers may be distinguished from one another. Moreover, it is desirable to employ transmitters 22 which operate on one milliwatt or less power, so that the resultant transmission range is only from about 300 to 500 feet, but preferably not over 500 feet. In view, therefore, of the relatively small ranges in which the transmitters will be effective, it is a relatively simple matter to assign carrier frequencies to customers in a given neighborhood in such manner as to prevent any interference of one carrier frequency with another.

In addition to reading gas meters, the instant invention is equally useful in reading water meters, and other types of household utility meters that have rotatable dial pointers that can be connected to the condenser C3 of an oscillator 21 in the manner above described. When there are a plurality of such meters in a given household, each meter will be provided with a separate transmitter 22, and an associated oscillator 21, which is responsive to the pointer on one of the dials of the associated meter. In such case the meters at a given location or residence will have different frequency ranges, so that the signal output of a transmitter connected with one meter will not interfere with the signal transmitted from another meter.

Figure 2:
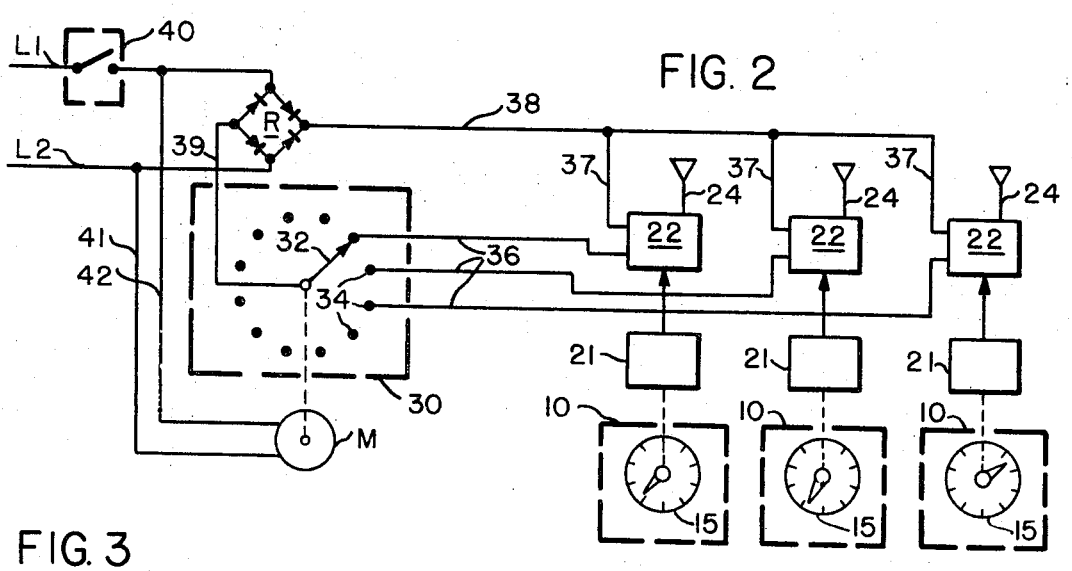
FIG. 2 is a wiring diagram illustrating schematically how this device may be adapted for reading a plurality of meters located in a single household.

FIG. 2 illustrates an embodiment in which a plurality of different meters of a houshold are connected so that they can all be read by the travelling meter reader. Like numerals designate elements similar to those illustrated in the embodiment shown in FIG. 1. 30 denotes a programmer for successively reading each of a plurality of meters 10, which may be located in the same building. These meters may belong to the same customer and may be his water, gas and electricity meters, respectively. The meters may, however, be located in a multiple dwelling, and may represent like meters of different customers.

The programmer 30 has a rotatably indexible contact or wiper arm 32, which is coupled to the shaft of a motor M for rotation thereby. Surrounding the axis of the wiper 32 are a plurality of angularly spaced electrical contacts 34, which are engageable successively by the wiper 32 in its rotation. Each of the contacts 34 is connected by a line 36 to the input of one of the transmitters 22 associated with the plurality of meters 10 located at the given location. The other input to each of these transmitters 22 is connected by leads 37 and 38 to one side of the output of a rectifier R. The other side of the output of the rectifier R is connected by a lead 39 to the wiper 32 of the programmer 30.

Power is supplied to the circuit from an alternating current supply, represented by the lines L1 and L2, when the normally open switch 40 is closed. The switch 40 may be closed in any convenient manner, as for example, by a radio signal from the vehicle containing the mobile receiver 26, or manually by the customer in accordance with a pre-arranged schedule, so that the programmer 30 will be working when the mobile receiver 26 passes the residence containing the several meters. When switch 40 is closed, power is supplied by lines L1 and L2 to the input of the rectifier R; and through the lines 41 and 42 to the motor M which rotates wiper 32, connecting the output of the rectifier successively to the inputs of the transmitters 22.

The particular transmitter energized depends upon which contact 34 is engaged by the wiper 32. For example the illustrated wiper 32 is shown engaged with that contact 34, which is connected through one of the lines 36 with the lefthand transmitter 22 illustrated in FIG. 2. When the wiper 32 is indexed (for example clockwise in FIG. 2) into engagement with the next successive contact 34, the left hand transmitter will become deenergized, and the middle transmitter 22 (FIG. 2) will become energized to transmit to the receiver 26 a signal corresponding to the meter reading of the middle meter 10, as illustrated in FIG. 2. There are twelve contacts 34 in the embodiment illustrated, so that the transmitters of twelve different meters 10 may be successively actuated during one revolution of the wiper 32.

The receiver 26 preferably is of the multi-channel, crystal-controlled type, with one channel for each different carrier frequency. When the vehicle containing the receiver 26 moves the receiver into the range of the transmitters shown in FIG. 2, the receiver 26 will receive all channels simultaneously, and will record the generated oscillator frequencies on the magnetic tape recorders 30, which will have a separate tape for each channel. If the three meters 10 illustrated in FIG. 2 belong to the same customer and represent gas, electricity and water consumption, respectively, the three associated transmitters 22 may be operated at the same carrier frequency, but the generated oscillator frequency ranges will differ for each transmitter so that although the signals picked up by the mobile receiver will be transcribed on the same tape, the frequency ranges will differ sufficiently to enable the readings of the gas, electric and water meters, respectively, to be distinguished from one another. If, on the other hand, each of the three meters 10 shown in FIG. 2 represents, for example, the gas meters of three different customers, the associated transmitters 22 will be operated at different carrier frequencies, and will be recorded on different tapes which correspond to respectively different channels of the receiver 26.

In a central office, the information on the tapes will be played back, and the generated oscillator frequencies may be counted and recorded on digital tapes in conventional manner. These tapes may then be fed into a pre-programmed digital computer, which will be pre-programmed to compute customer identification, consumption, amount due in dollars and cents, etc.

From the foregoing it will be apparent that the instant invention provides a reliable and expeditious device for reading conventional meters from a distance, and without actually viewing the indicating dials on the meters. With this invention the meter reader need only drive or otherwise transport the mobile receiver 26 and its associated magnetic tape recorders 30 past a residence having meters with signal devices of the type shown in FIG. 1, and the meter readings will be automatically recorded accurately and rapidly. For example, if the invention is used in an apartment building having say 12 programmers of the type shown at 30 in FIG. 2, it would be possible to read 144 meters in a brief instant. The reason for this is that each programmer could have its wiper 32 driven at a rate of approximately ½ a revolution per second, so that within two seconds, the simultaneously rotating wipers could read all 144 meters. Within the same period of time the multi-channel receiver 26 could receive and record these readings on the tape recorders 30 for future reference.

Although the invention has been described as being particularly useful for reading utility meters, it will be apparent that it would be equally as useful for reading from a distance any meter, which has a movable pointer, or the like, which may be connected to condenser C3 in a manner similar to pointer 20.

While the invention has been described in connection with specific embodiments thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. Apparatus for reading at a distance, a stationary totalizing meter of the type having a movable indicator for registering the cumulative quantity of a metered item, comprising:

means adjacent said meter for developing a radio signal of variable frequency, means adjacent said meter for transmitting said signal, mobile means for receiving said signal at a point spaced from said meter and from said transmitting means, and means coupled to the output of said receiving means for recording the signal received by said receiving means, said developing means including an adjustable element connected to said indicator and responsive to the movement thereof to change the frequency of said signal in proportion to the movement of said indicator.

2. Apparatus as defined in claim 1, wherein:

said signal developing means comprises an oscillator, said element is an adjustable condenser in said oscillator having a movable portion connected to said indicator for adjustment thereby, and said transmitting means comprises a transmitter mounted on said meter and having a directional antenna for transmitting said signal in a generally predetermined direction and toward said receiving means.

3. Apparatus for reading at a distance a plurality of stationary totalizing meters, each of which has a movable indicator for registering the cumulative quantity of the item metered by said meter, comprising:

a transmitter associated with each meter, means for successively energizing said transmitters one at a time, means associated with each meter for developing a radio signal for transmission by the associated transmitter, when the latter is energized, means for altering the frequency of each developed signal in correspondence with the movement of the indicator on the associated meter, and mobile means remote from the meters to receive and record the transmitted signals, whereby the readings of said meters are represented by the frequencies of signals transmitted.

4. Apparatus as defined in claim 3, wherein said means for successively energizing said transmitters comprises:

a rotatable stepper switch operative, when rotated, cyclically and intermittently to energize successive ones of said transmitters, drive means for rotating said stepper switch, and means for selectively actuating said drive means, including a normally-open switch connected to said drive means and responsive to a signal from said mobile means to close said switch and actuate said drive means.

References Cited

UNITED STATES PATENTS

| | | | |
|---|---|---|---|
| 1,849,870 | 3/1932 | Fitz Gerald | 340—207 |
| 2,609,438 | 9/1952 | Winterhalter | 325—51X |

THOMAS B. HABECKER, Primary Examiner

U.S. Cl. X.R.

325—51; 340—151, 188, 208